April 4, 1961  H. W. SCHMITZ  2,977,623
WINDSHIELD CLEANING MECHANISM
Filed Sept. 26, 1957  5 Sheets-Sheet 1

INVENTOR.
HARRY W. SCHMITZ
BY
G. H. Strickland
HIS ATTORNEY

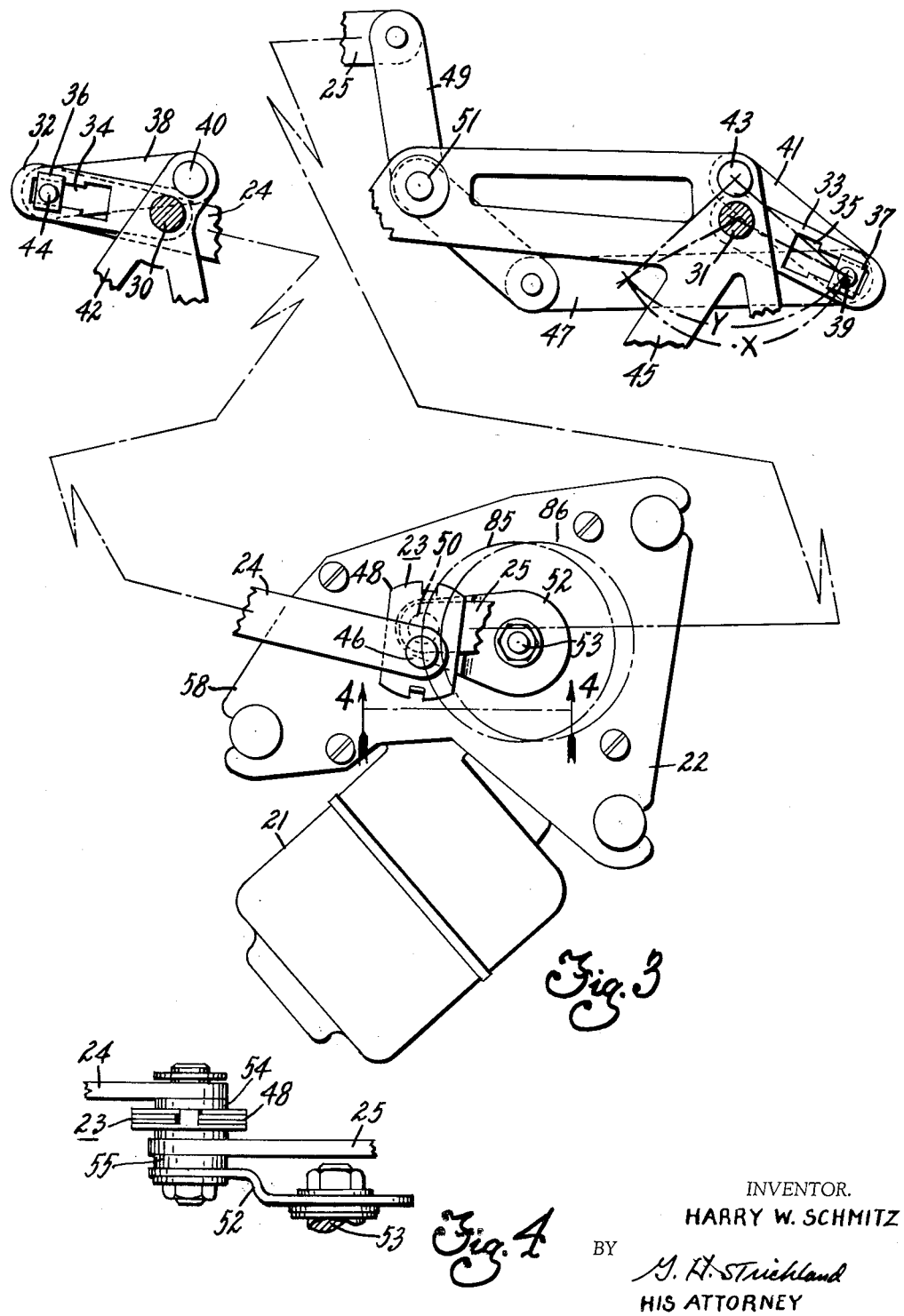

April 4, 1961   H. W. SCHMITZ   2,977,623
WINDSHIELD CLEANING MECHANISM
Filed Sept. 26, 1957   5 Sheets-Sheet 3
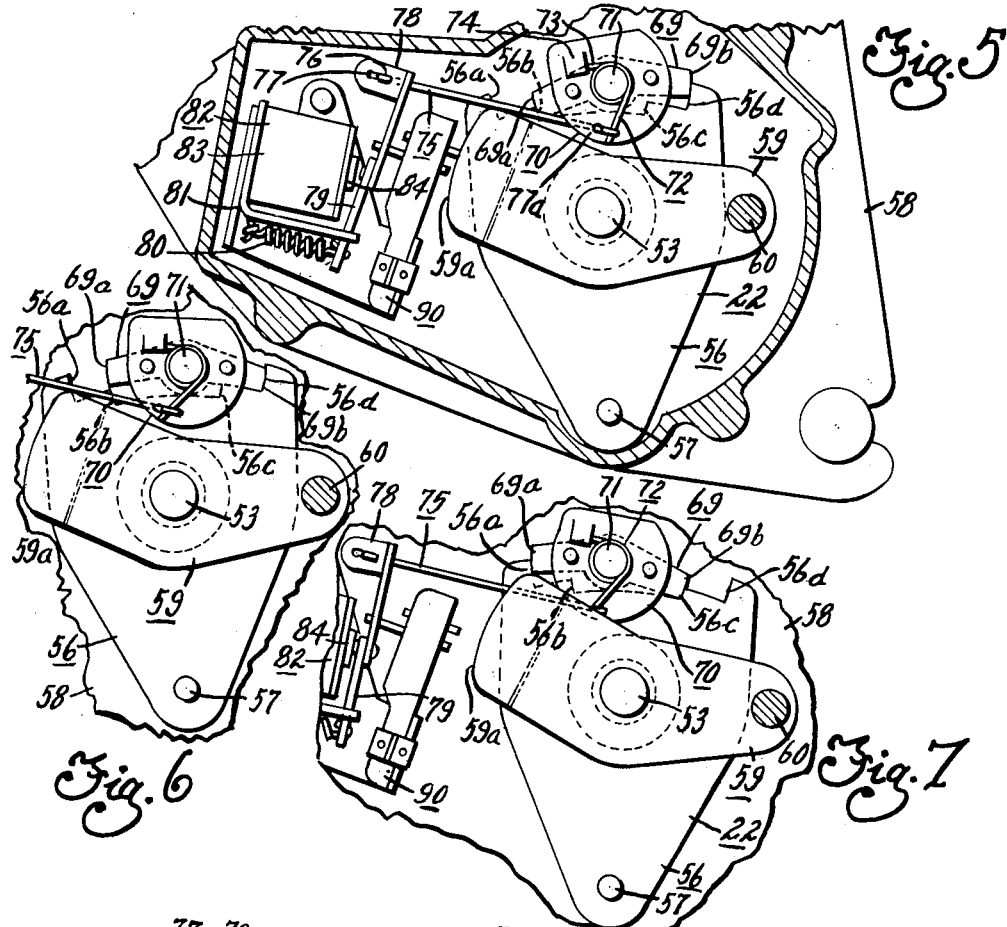
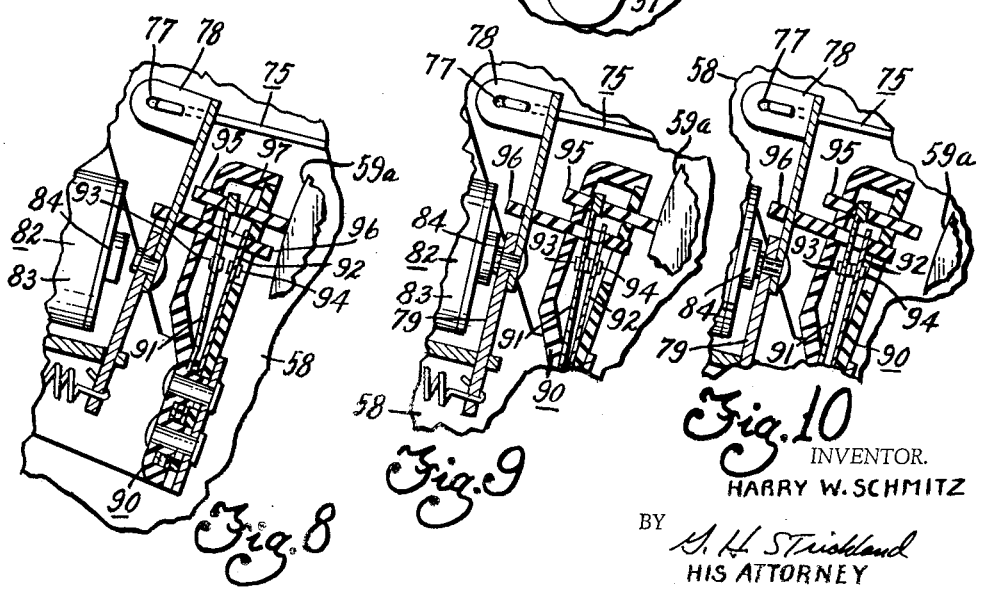
INVENTOR.
HARRY W. SCHMITZ
BY G. H. Strickland
HIS ATTORNEY April 4, 1961 H. W. SCHMITZ 2,977,623
WINDSHIELD CLEANING MECHANISM
Filed Sept. 26, 1957 5 Sheets-Sheet 4

INVENTOR.
HARRY W. SCHMITZ
BY
*G. H. Strickland*
HIS ATTORNEY

April 4, 1961  H. W. SCHMITZ  2,977,623
WINDSHIELD CLEANING MECHANISM
Filed Sept. 26, 1957  5 Sheets-Sheet 5

INVENTOR.
HARRY W. SCHMITZ
BY
M. H. Strickland
HIS ATTORNEY

United States Patent Office 2,977,623
Patented Apr. 4, 1961

2,977,623

WINDSHIELD CLEANING MECHANISM

Harry W. Schmitz, Rochester, N.Y., assignor to General Motors Corporation, Detroit, Mich., a corporation of Delaware Filed Sept. 26, 1957, Ser. No. 686,432

9 Claims. (Cl. 15—250.02)

This invention pertains to the art of windshield cleaning, and particularly to mechanism for actuating windshield wipers from a rotary power source either alone, or conjointly with means for spraying liquid solvent onto the windshield.

Heretofore, it has been proposed to impart asymmetrical oscillation to a pair of spaced wiper arms and blades by means of linkages from a rotary power source. In prior mechanisms, it has been customary to incorporate some type of adjustable eccentric mechanism to vary the path of movement of the wiper blades so as to achieve depressed parking, that is parking outside of the normal wiping stroke. Prior eccentric mechanisms are either of the type which vary the effective lengths of crank arms or the effective lengths of connecting rods. The present invention relates to wiper actuating mechanism driven from a rotary power source including means for shifting the orbit of a driven crank pin by shifting the axis of the shaft which rotates the crank pin so as to shift the path of movement of the wiper blades and achieve depressed parking. In addition, the rotary power source, which may take the form of an electric motor, can also be used to actuate a washer pump which, in combination with the disclosed control mechanism times the operation of the washer pump, automatically operates the wiper motor at high speed during the washing cycle, reduces the speed of the wiper motor during the drying cycle and thereafter conditions the wiper motor for automatic deenergization with the wiper blades in the parked position.

Accordingly, among my objects are the provision of windshield wiper actuating mechanism including a rotary driving member for rotating a crank pin, the crank pin being radially adjustable relative to the axis of rotation of the driving member; the further provision of a wiper actuating mechanism driven by a rotary power source including means operable to automatically shift the position of a crank pin by reaction forces in the drive linkage; the further provision of wiper actuating mechanism of the aforesaid type including latch means for selectively freeing and restraining a crank pin for radial movement relative to its rotary driving member; and the further provision of windshield wiper actuating mechanism of the aforesaid type including electromagnetic means for controlling the position of the latch means and actuating a parking switch; the further provision of a windshield wiper drive system for operating a pair of cleaner assemblies over asymmetrical paths from a crank mechanism disposed on one side of a rotary shaft including a reversing linkage for one of the cleaners; the further provision of actuating mechanism including a driven crank shaft, the axis of which can be shifted to vary the orbit of crank means carried thereby; and the still further provision of a windshield cleaning system including a washer pump and a wiper motor having automatic means for controlling the speed of the wiper motor during the washing and drying cycles.

The aforementioned and other objects are accomplished in the present invention by utilizing the reaction forces in the drive linkage for shifting the position of the crank means. Specifically, the windshield cleaning mechanism includes a unidirectional electric motor which is drivingly connected to a worm gear, or driving means, having a radially adjustable crank pin. The crank pin is guided for movement in a radial slot formed in a plate attached to the worm gear. In one embodiment, the crank pin is pivotally connected to one end of a connecting rod by a pair of links to the opposite ends of a rocker arm. The rocker arm is attached to an oscillatory driven shaft whereby rotation of the worm gear will effect oscillation of the driven shaft.

The crank pin is connected to a lever which is rotatably supported on a plate, the plate being pivotally supported in a housing. The plate has a plurality of abutments thereon. A latch arm is pivotally supported in the housing for engagement with the abutments on the plate, the latch arm being movable between two positions wherein the plate is selectively freed and then restrained against movement by the reaction forces of the drive linkage connecting the driving shaft with the spaced cleaner assemblies. The latch is movable by an arm assembly having a detent spring thereon for maintaining the latch in the selected position. Any suitable means may be employed to deenergize the wiper motor when the wiper blade arrives at the parked position, for example, the parking switch actuating mechanism shown in copending application Serial No. 551,800 filed December 8, 1955, in the name of Elmer E. Reese and assigned to the assignee of this invention, now Patent No. 2,866,344.

In the preferred embodiment, the radially adjustable crank pin is carried by a crank arm affixed to a stub shaft which is bodily movable within a housing. The stub shaft, or driven member, is rotatably supported in a bearing, the bearing being pivotally attached to the cover of the housing. The stub shaft has a crank arm attached thereto at its outer end having a first crank pin. A second crank arm is attached to the first crank pin having a second crank pin at its outer end, both of the crank pins having their axes located the same radial distance from the axis of the stub shaft. The inner end of a connecting rod is rotatably journalled on each of the crank pins. The outer ends of the connecting rods are attached to transmission assemblies for oscillating the cleaner assembly across the surface of the windshield.

The bearing plate for supporting the stub shaft is formed with a plurality of abutments cooperable with the ends of a latch arm. The latch arm is carried by a plate journalled on a pin carried by the cover. The plate which carries the latch arm is operatively connected with a relay for controlling the position of the crank arm, and hence controlling the position of the bearing plate which carries the stub shaft.

In addition, the crank arm which carries the crank pin driven by the worm gear is formed with a cam surface for actuating a parking switch to deenergize the motor when the wiper blades arrive at the depressed parked position. The parking switch is positively actuated to deenergize the motor as well as to energize the motor, the latter movement of the parking switch being effected by the relay which controls the latch arm.

Moreover, the wiper actuating mechanism may be combined with the windshield washer pump of the general type shown in copending applications Serial No. 634,867 filed January 18, 1957, in the name of Eugene R. Ziegler, now Patent No. 2,878,505, and Serial No. 674,495 filed July 26, 1957, in the name of Schmitz et al., both assigned to the assignee of this invention.

Further objects and advantages of the present invention will be apparent from the following description, reference being had to the accompanying drawings, wherein preferred embodiments of the present invention are clearly shown.

In the drawings:

Figure 3 is a fragmentary view, partly in section and partly in elevation, of cleaner mechanism constructed according to the preferred embodiment of this invention.

Figure 4 is a fragmentary view taken along the line 4—4 of Figure 3.

Figure 5 is a fragmentary view, partly in section and partly in elevation, depicting the latch mechanism of the preferred embodiment taken generally along line 5—5 of Figure 12, in the parked position.

Figure 6 is a view similar to Figure 5 of the latch mechanism when going out of the parked position.

Figure 7 is a view similar to Figure 5 showing the latch mechanism in the running position.

Figure 8 is a fragmentary view, partly in section and partly in elevation, of the parking switch in the parked position.

Figure 9 is a view similar to Figure 8 showing the parking switch when going out of the parked position.

Figure 10 is a view similar to Figure 8 showing the parking switch in the running position.

Figure 1:
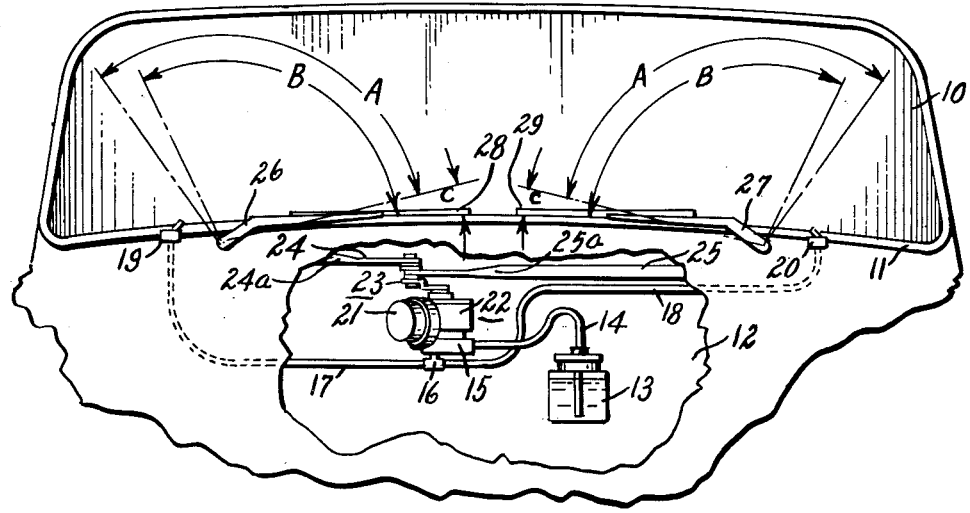
Figure 1 is a fragmentary view with certain parts broken away of a vehicle equipped with the windshield cleaning mechanism of this invention.

With particular reference to Figure 1, a portion of a vehicle is shown including a windshield 10, a lower rail 11 and a firewall 12. The vehicle is equipped with windshield cleaning mechanism including a jar, or reservoir 13, of liquid solvent which is connected to a conduit 14. The conduit 14 connects with a washer pump 15, the washer pump being of the type disclosed in the aforementioned copending application Serial No. 674,495.

The washer pump delivers liquid solvent under pressure to a coupling 16 connected to a conduit 17 and 18 which terminate in nozzles 19 and 20, respectively, for discharging liquid onto the windshield 10 and into the path of the wiper blades.

The pump 15 is driven by an electric motor 21 which is also used to drive an actuating mechanism indicated generally by the numeral 22 which includes crank means 23, to which the inner ends of connecting rods 24 and 25 are pivotally connected. The connecting rods 24 and 25 are twisted intermediate their ends as indicated by numerals 24a and 25a. As will be described hereinafter, the outer ends of the connecting rods are operatively connected with spaced wiper shafts which have attached thereto wiper arms 26 and 27, respectively, carrying wiper blades 28 and 29. The wiper blades 28 and 29 are movable across the outer surface of windshield 10 in asymmetrical paths, through a running stroke as indicated by the angle A and a parking stroke as indicated by the angle B. The wiping and parking strokes are of equal amplitude, but the parking stroke is shifted throughout an angle C at the inboard stroke end so that the wiper blades 28 and 29 engage the lower rail 11 of the windshield when in the parked position. This position of the wiper blades is also known as a depressed parked position.

With particular reference to Figures 3 and 4, in the preferred embodiment the wiper arms 26 and 27 are connected to rotate with spaced wiper shafts 30 and 31, respectively. Wiper shaft 30 has connected thereto a crank arm 32 having an elongate slot 34 therein. The elongate slot 34 receives a slider 36 fixed to the end of a second crank arm 38, the inner end of which is attached to a shaft 40 rotatably journalled in a bracket 42 attached to the firewall. The shaft 30 is likewise journalled in the bracket 42. Since the axes of shafts 30 and 40 are spaced apart, and the length of crank arm 38 is greater than the length of crank arm 32, it will be appreciated that a predetermined angular movement of the crank arm 38 will effect a greater movement of the crank arm 32, this being known as an angle multiplying transmission linkage. The outer end of connecting rod 24 is rotatably supported on a crank pin 44 carried by the slider 36, the crank pin likewise being attached to the crank arm 38.

The wiper shaft 31 has attached thereto a crank arm 33 having a slot 35 receiving slider 37, the slider 37 carrying a crank pin 39 attached to a crank arm 41. The crank arm 41 is attached to a shaft journalled in a bracket 45, within which the shaft 31 is also journalled. The crank pin 39 is connected by an idler link 47 to a reversing bell crank 49, having an intermediate pivot 51 in the bracket 45. The other end of the bell crank 49 is rotatably connected to the outer end of connecting rod 25. The angle of multiplication is clearly shown in Figure 3 with respect to shaft 31, wherein when the crank arm 41 oscillates throughout an angle X, the crank arm 33 oscillates through an angle Y which is greater than the angle X. The right hand transmission shaft 31 includes a reversing link, as aforedescribed, since the crank means 23 are disposed on only one side of the axis of a driven shaft as will be described.

The crank means 23 includes a crank pin 46 rigidly attached to a plate 48. The plate 48 is attached to a second crank pin 50 which is rigidly attached to a crank arm 52, the inner end of which is fixed to a rotary shaft 53. The inner end of connecting rod 24 is rotatably journalled on the crank pin 46 by means of a bushing 54, and the inner end of connecting rod 25 is rotatably journalled on the crank pin 50 by a bushing 55. It is pointed out that the end of crank arm 52 is offset as indicated in Figure 4 so that during rotation thereof, the connecting rod 25 will not interfere with the end of shaft 53.

Figure 11:
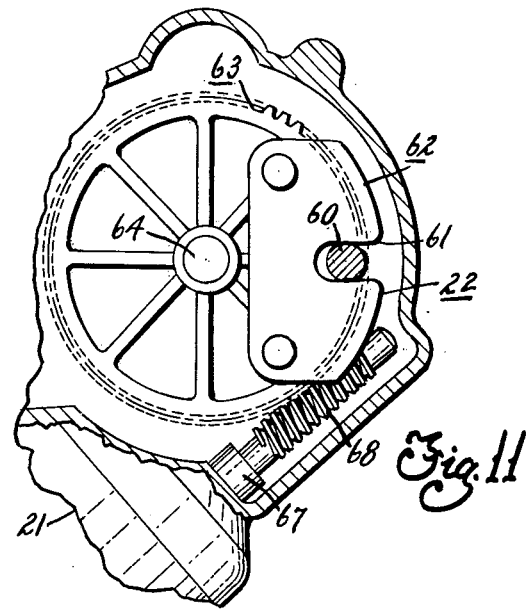
Figure 11 is a view partly in section and partly in elevation of the adjustable crank pin assembly taken along line 11—11 of Figure 12.
Figure 12:
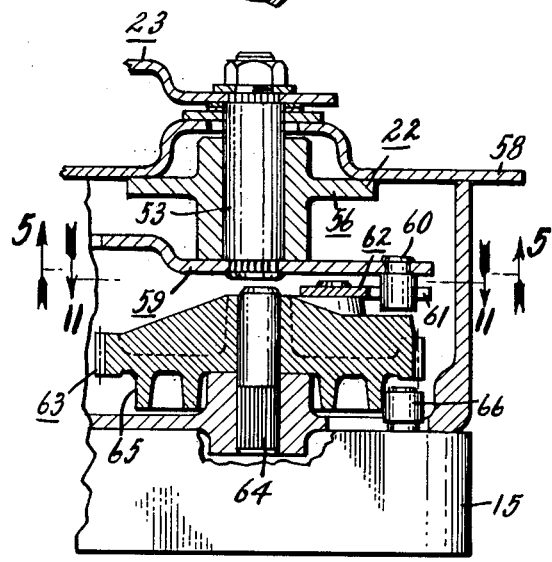
Figure 12 is a sectional view of the driving means constructed according to the preferred embodiment.

With particular reference to Figures 11 and 12, the shaft 53 is rotatably supported in a bearing element 56, which, as shown in Figure 5, comprises a plate pivotally mounted by a pin 57 to a cover member 58. The cover member 58 as shown in Figure 3, also constitutes a bracket by which the motor 21 can be attached to the firewall 12 of a vehicle. Referring again to Figure 12, the shaft 53 has attached to its inner end a crank arm 59 carrying a crank pin 60. The crank pin 60 is rigidly attached to the crank arm 59, and is slidably received in a radial slot 61 of a plate 62 attached to a worm gear 63. The worm gear 63 is rotatably journalled about a fixed shaft 64, and includes a cam surface 65 which is engaged by a follower 66 of the washer pump 15. The washer pump 15, as aforementioned, is of the type shown in copending application Serial No. 674,495.

Referring to Figure 11, it can be seen that the electric motor 21 includes an armature shaft 67 having a worm 68 thereon which meshes with the worm gear 63. As seen in Figure 5, the crank arm 59 is formed with a cam surface 59a, the purpose of which will be described hereinafter. In addition, the bearing element 56 is formed with a plurality of abutments, or shoulders, 56a, 56b, 56c and 56d. The abutments 56a, 56b, 56c, and 56d can be engaged by the ends 69a and 69b of a latch 69 attached to a plate 70 pivotally mounted on a pin 71 attached to the cover 58. The pin 71 is encircled by a torsion spring 72 having one end 73 engaging a tang 74 on the plate 70, and the other end attached to a wire link 75 which also passes through an elongate slot 77a in plate 70. The wire link 75 has its other end 76 extending through a hole 77 in a bracket 78 attached to an armature 79. The armature 79 is normally biased to the position shown in Figure 5 by a coil spring 80, one end of which is attached to the armature 79 and the other end of which is attached to a bracket 81 carried by the plate 58 and supporting an electromagnet 82. The electromagnet includes a coil 83 and a core 84, and, when energized, the armature 79 is moved into engagement with the core 84 as shown in Figure 7.

When the coil 83 of the electromagnet is energized, as shown in Figure 7, the armature 79 is moved into engagement with the core 84 thereby moving the wire link 75 from the position of Figure 3 to the position of Figure 6 through the bracket 78. The torsion spring 72 allows the armature 79 to close and applies a turning force to the latch 69 although the latch may still remain in the park position. This causes the torsion spring 72 to effect movement of the latch 69 from the position of Figure 5 to the position of Figure 6. With the latch in the position of Figure 6, end 69a is disengaged from shoulder 56b of the bearing plate 56. Due to the reaction forces in the drive linkage, including the connecting rods 24 and 25, rotation of the worm gear 63 will cause the plate 56 to pivot from the position of Figure 5 to the position of Figure 7 whereupon the end 69b of the latch 69 will engage the abutment 56a. When the plate 56 pivots from the position of Figure 5 to the position of Figure 7, the stub shaft 53 is bodily moved so as to vary the orbit of the crank pins 46 and 50.

Conversely, when the electromagnet 82 is deenergized, the armature 79 moves from the position of Figure 7 to the position of Figure 5 by action of coil spring 30, whereupon the latch 69 will move from the position of Figure 7 to the position of Figure 5 so as to permit the reaction forces to shift the plate 56 from the position of Figure 7 to the position of Figure 5. When the plate 56 is in the position of Figure 5, the orbit of the crank pins 46 and 50 is indicated by the circle 85 in Figure 3, whereas when the plate 56 is in the position of Figure 7, the orbits of the crank pins 46 and 50 are indicated by the circle 86. By shifting the orbits of the crank pins 46 and 50, the paths of movement of the wiper blades and arms will be shifted from the angle A to the angle B so that the wiper blades will move against the lower rail 11 to the parked position.

Since the mechanism is driven by an electric motor 21, a parking switch must be incorporated for deenergizing the motor when the wiper blades reach the depressed parked position as shown in Figure 1. To accomplish this result, a parking switch 90 is mounted on the cover 58. As seen in Figure 8, the parking switch includes a pair of leaf springs 91 and 92 carrying contacts 93 and 94, respectively. The leaf springs 91 and 92 are disposed within an insulated housing, in which a pair of insulating plungers 95 and 96 are supported for reciprocable movement. The plunger 95 receives the end of the leaf spring 91, and the plunger 96 has a slot 97 therein through which both of the leaf springs extend. In addition, the plunger 96 is connected to the bracket 78 for movement therewith, while the plunger 95 extends outwardly of the housing and can be engaged by the cam surface 59a on the crank arm 59.

When the bearing plate 56 is in the position of Figure 7, wherein the crank means rotating in the running orbit, namely, circle 86, the cam surface 59a does not engage the plunger 95. However, when the bearing plate 56 is in the position of Figure 5, the cam surface 59a will engage the plunger 95 so as to move leaf spring 91 to the position of Figure 8 wherein the contacts 93 and 94 are separated to deenergize the motor 21 when the wiper-blades reach the parked position.

Upon energization of the electromagnet 82, the armature 79 moves into engagement with the core 84, thereby moving the bracket 78 to the position of Figure 9, and in so doing, the plunger 96 moves the leaf spring 92 so that the contact 94 engages the contact 93. Thus, the parking switch mechanism of the present invention incorporates positive actuating means for both closing and opening the parking switch contacts. After the bearing plate 56 resumes its running position, the cam 59a does not engage the plunger 95, and hence the contacts 93 and 94 remain in engagement.

Figure 2:
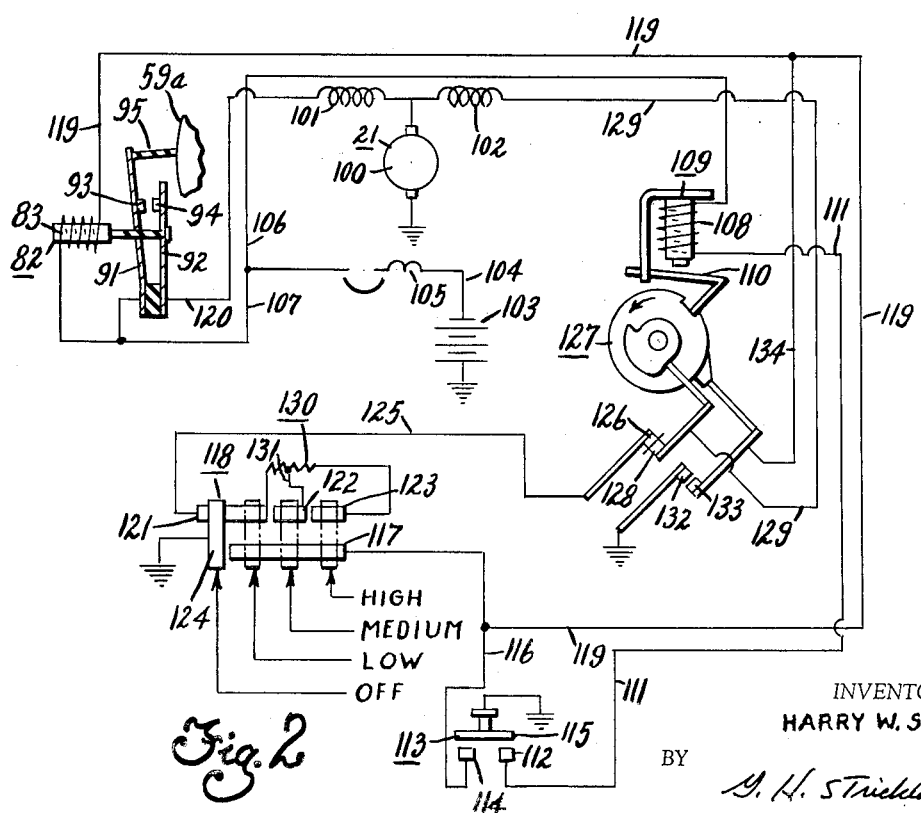
Figure 2 is a schematic wiring diagram of the control system for the windshield cleaner mechanism.

Referring to Figure 2, the control circuit for the motor 21 will be described. The motor 21 includes an armature 100 having one of its brushes connected to ground, and the other brush connected to one end of a series field winding 101 and a shunt field winding 102. The electric motor 21 can be energized from a battery 103, one terminal of which is connected to ground and the other terminal of which is connected to a wire 104. Wire 104 is connected through a thermal overload circuit breaker 105 to wires 106, and 107. Wire 107 is connected to a leaf spring 91 carrying a parking switch contact 93. Wire 106 is connected to a winding 108 of a washer relay 109 having a pivotally movable armature 110. The other end of the winding 108 is connected to wire 111 which is connected to a terminal 112 of a push button washer switch 113 including a second terminal 114 and a bridging member 115 which is connected to ground. The terminal 114 is connected to wire 116 which connects with a stationary contact 117 of a manual wiper control switch 118. In addition, the wire 116 connects with a wire 119 which connects with electromagnet coil 83, the other end of the coil 83 being connected to wire 107. The parking switch leaf spring 92 carrying contact 94 is connected to a wire 120 which connects with one end of the series field winding 101.

The manual control switch 118 also includes stationary contacts 121, 122 and 123, as well as a movable bridging contact 124. The movable bridging contact 124 is connected to ground. Stationary contact 121 is connected by wire 125 to a switch contact 126 controlled by the washer ratchet cam 127. Switch contact 126 is engageable with switch contact 128 which is connected by wire 129 to the other end of the shunt field winding 102. In addition, switch contact 121 is connected to one end of a resistor 130, having an intermediate tap 131 connected to contact 122, the other end of resistor 130 being connected to contact 123.

The ratchet cam 127 controls a second switch including a contact 132 which is grounded, a contact 133 which is connected to a wire 134 that connects with the wire 119.

When the manual control switch 118 is moved from the "off" position to the low speed position, the winding 83 will be energized from ground thereby moving the contact 94 of leaf spring 92 into engagement with the contact 93. This will complete the energizing circuit for the motor 21 at low speed, since the shunt field winding 102 is fully energized. Accordingly, the motor 21 will rotate and the latch arm 69 will be moved from the position of Figure 5 to the position of Figure 6 thereby permitting the reaction forces to shift the bearing plate 56 from the position of Figure 5 to the position of Figure 7, where it will be retained as long as the electromagnet is energized. The wiper blades 28 and 29, accordingly, will move throughout their wiping strokes as indicated by angle A.

Should the operator desire a higher speed of the motor operation, the bridging contact 124 can be moved to the medium speed position wherein a portion of resistor 130 is connected in series with shunt field winding 102. During high speed operation, the entire resistor 130 is connected in series with the shunt field winding 102. Irrespective of whether the motor is running at low, medium or high speed, the electromagnet 83 remains energized and the wiper blades are oscillated throughout their running strokes as indicated by angle A in Figure 1.

When the operator moves the bridging contact 124 to the "off" position, as shown in Figure 2, the electromagnet 82 is deenergized, but contacts 93 and 94 remain in engagement. Deenergization of electromagnet 82 releases the latch arm 69 and permits the reaction forces to shift the bearing plate 56 from the position of Figure 7 to the position of Figure 5, wherein the orbit of the crank means is now defined by circle 85 of Figure 3. When the wiper blades reach the depressed parked position, the cam surface 59a will engage the plunger 95 to separate parking switch contacts 93 and 94 whereupon the motor will be deenergized with the wiper blades in the parked position.

In accordance with the teachings of the aforementioned copending application Serial No. 674,495, when the washer push button 113 is momentarily closed, the relay coil 108 is energized, thereby attracting the armature 110, and simultaneously therewith the electromagnet 83 is energized. Accordingly, the motor 21 will be energized, and after the ratchet cam 127 is moved throughout the distance of one tooth, the button 113 can be released since the contact 133 will engage contact 132 so as to maintain the electromagnet 82 energized. During the first one-half revolution of the ratchet cam 127, the contacts 126 and 128 will be open, and accordingly, the shunt field winding 102 will be deenergized, or open circuited, whereupon the motor will run at high speed as a series motor. During high speed operation of the motor, liquid solvent is discharged onto the windshield. After one-half revolution of the ratchet cam 127, the switch contact 126 and 128 will thereby energize the shunt field winding whereupon the motor 21 will run at low speed during the drying cycle. After a complete revolution of the ratchet cam the contacts 132 and 133 will open and the wiper blades will be parked.

Figure 14:
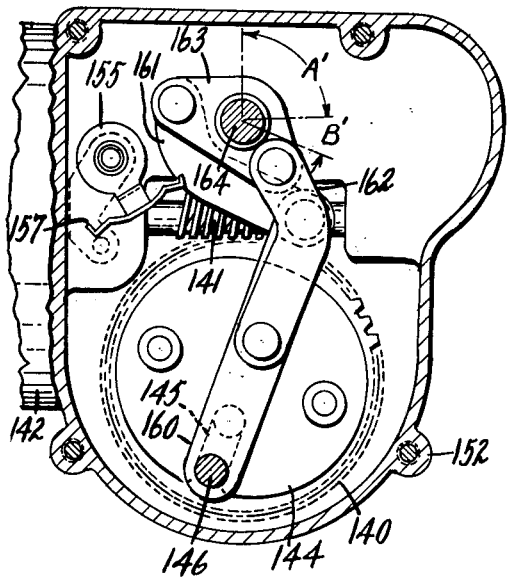
Figure 14 is a view, partly in section and partly in elevation, taken along line 14—14 of Figure 13.
Figure 13:
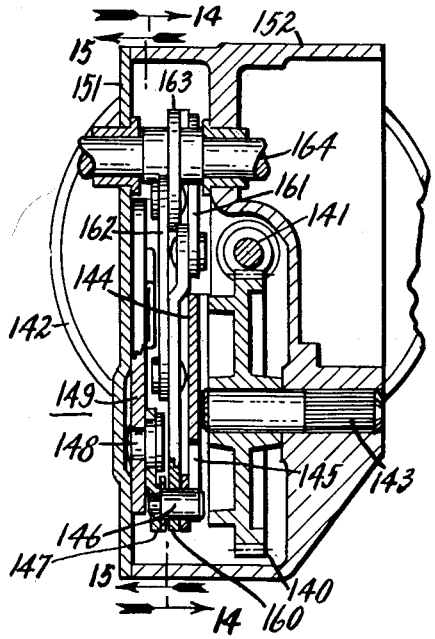
Figure 13 is a sectional view of the actuating mechanism constructed according to the modified embodiment of this invention.
Figure 15:
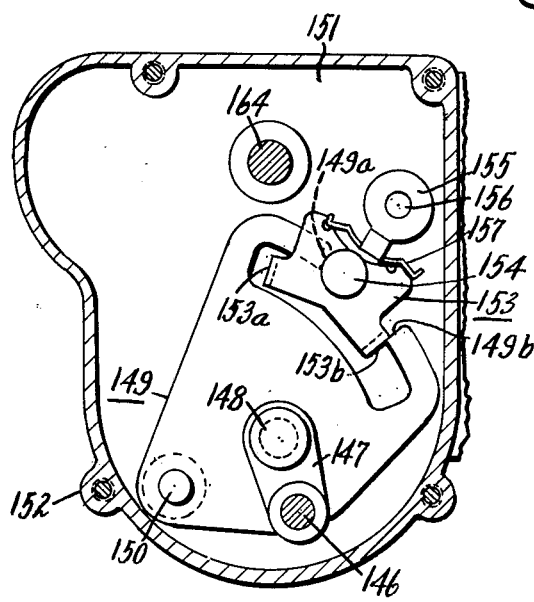
Figure 15 is a view, partly in section and partly in elevation, taken along line 15—15 of Figure 13.

With particular reference to Figures 13 through 15, in a modified embodiment, the variable crank throw mechanism is applied to an oscillating type actuating mechanism, rather than a rotary type actuating mechanism. The mechanism shown in Figures 13 through 15 is somewhat similar to that shown in Patent No. 2,866,344, thus, includes a worm gear 140 driven by a worm 141 which is rotated by an electric motor 142. The worm gear 140 is journalled for rotation about a fixed shaft 143, and has affixed thereto a plate 144 having a radial slot 145. The slot 145 receives a crank pin 146 carried by an arm 147 rotatably journalled on a pin 148 carried by a plate 149.

The plate 149 is pivotally mounted by a pin 150 in the cover 151 of the housing 152. The plate 149 is formed with a pair of spaced abutments 149a and 149b cooperable with a latch arm 153 pivotally mounted on a pin 154 attached to the cover 151. The latch arm 153 has ends 153a and 153b engageable, respectively, with abutments 149a and 149b. The latch arm 153 is movable between running and parking positions by means of an arm 155 mounted on a pin 156 and carrying a leaf spring 157 for moving the latch arm 153 and retaining it in the selected position.

The crank pin 146 has one end of a connecting rod 160 rotatably connected thereto, the other end of the connecting rod being connected by crossed links 161 and 162 to a rocker arm 163. The rocker arm 163 is attached to an oscillatable driven shaft 164. The oscillatable driven shaft 164 is movable throughout an angle A' when the crank pin is in its innermost position as indicated by dotted lines in Figure 14, and through the angle A'+B' when the crank pin 146 is in the solid line position of Figure 14.

Upon rotation of the worm gear, or driving member, 140, rotation will be imparted to the crank pin 146, which rotation is permitted by the rotatable support of the link, or arm, 147 on the plate 149. With the crank pin 146 in its innermost radial position as indicated by dotted lines in Figure 14, the shaft, or driven member, 164, will be oscillated throughout the angle A'. In this instance, the end 153a of the latch arm 153 is in engagement with the abutment 149a of the plate 149 so as to maintain the throw of the crank pin 146 at a minimum.

When it is desired to park the windshield wipers, the arm 155 is actuated to shift the latch arm 153 thereby freeing the plate 149 for movement due to reaction forces of the linkage to the position of Figure 15, whereupon the throw of the crank pin 146 becomes a maximum so that the shaft 164 is oscillated throughout the angle A' to B'. When the shaft arrives at the position of Figure 14, the motor 142 can be automatically deenergized by a suitable parking switch mechanism such as shown in the aforementioned Patent No. 2,866,344.

From the foregoing it is readily apparent that the present invention provides a unique actuating mechanism which can be used with both a rotary drive system and an oscillating drive system. Irrespective of the type of system in which it is used, the arrangement incorporates a radially adjustable crank pin, the position of which is shifted automatically by reaction forces in the driving linkage when the control element therefor is manually released.

While the embodiments of the invention as herein disclosed constitutes preferred forms, it is to be understood that other forms might be adopted.

What is claimed is as follows:

1. Windshield cleaning mechanism including a washer pump, a unidirectional electric motor, a worm gear drivingly connected with said motor and having a cam surface thereon, a plate attached to said worm gear having a radial slot therein, a crank pin slidably received in said slot, a crank arm carrying said crank pin, a driven shaft connected to said crank arm whereby rotation of said worm gear will effect rotation of said driven shaft, pivotally mounted bearing means journalling said shaft and bodily movable to shift the position of said shaft, crank means carried by said shaft, a wiper unit, means interconnecting said crank means and said wiper unit whereby said motor has a continuous driving connection with said wiper unit, and means for freeing said bearing means for bodily movement due to the reaction forces of said interconnecting means to vary the orbit of said crank means, said cam surface on said worm gear being designed to actuate said washer pump.

2. Windshield wiper actuating and control mechanism including, a unidirectional electric motor, an energizing circuit for said motor including a parking switch, a worm gear driven by said motor and having a plate thereon with a radial slot, a crank pin slidably received in said radial slot, a crank arm carrying said crank pin and having a cam surface for opening said parking switch to deenergize said motor, a driven shaft connected to said crank arm, a pivotally mounted bearing element journalling said driven shaft, crank means attached to said driven shaft, latch means cooperating with said bearing element for controlling the position thereof due to reaction forces caused by rotation of said worm gear, an electromagnet having an armature operatively connected to said latch means for controlling the position thereof, said armature being operatively connected to said parking switch for closing said parking switch upon energization of said electromagnet, and a manual switch for controlling the energization of said electromagnet whereby when the electromagnet is energized, the latch means permits movement of said parking element to a first position and restrains further movement thereof so as to maintain a fixed orbit for said crank means, and when said electromagnet is deenergized said latch means permits pivotal movement of said bearing element to a second position due to the reaction forces to shift the orbit of said crank means.

3. Windshield wiper actuating and control mechanism including, an electric motor, a variable throw crank assembly driven by said electric motor, an energizing circuit for said motor including a parking switch comprising a pair of spaced leaf spring contact members inherently resiliently biased towards each other, a first actuator rigidly connected to one of said contact members and a second actuator having a lost motion connection with the other of said contact members, two position control means for said variable throw crank assembly having a connection with said second actuator for closing said parking switch irrespective of the position of said first actuator when the control means is in one position, and means engageable with said first actuator to open said parking switch when the control means is in the other position.

4. Windshield wiper actuating and control mechanism including, an electric motor, a variable throw crank assembly driven by said electric motor, an energizing circuit for said motor including a parking switch comprising a pair of spaced leaf spring contact members inherently resiliently biased towards each other, a first actuator rigidly connected to one of said contact members and a second actuator having a lost motion connection with the other of said contact members, two position control means for said variable throw crank assembly having a connection with said second actuator for closing said parking switch irrespective of the position of said first actuator when said control means is in one position, and a cam member driven by said motor for operating said first actuator to open said parking switch when said control means is in the other position.

5. The actuating and control mechanism set forth in claim 4 wherein said control means includes an electromagnet.

6. The actuating and control mechanism set forth in claim 5 wherein said electromagnet includes an armature, said second actuator being carried by said armature.

7. Windshield wiper actuating and control mechanism including, an electric motor, an energizing circuit for said motor including a parking switch comprising a pair of spaced leaf spring contact members inherently biased towards each other, a first actuator rigidly connected to one of said contact members and a second actuator having a lost motion connection with the other of said contact members, two position control means connected with said second actuator for closing said parking switch irrespective of the position of the first actuator when said control means is in one position, and means engageable with said first actuator to open said parking switch when said control means is in the other position.

8. Windshield wiper actuating and control mechanism including, an electric motor, an energizing circuit for said motor including a parking switch comprising a pair of spaced leaf spring contact members inherently biased towards each other, a first actuator rigidly connected to one of said contact members and a second actuator having a lost motion connection with the other of said contact members, two position control means having a connection with said second actuator for closing said parking switch irrespective of the position of said first actuator when said control means is in one position, and a cam member driven by said electric motor for operating said first actuator to open said parking switch when said control means is in the other position.

9. Windshield wiper actuating and control mechanism including, an electric motor, an energizing circuit for said motor including a parking switch comprising a pair of spaced leaf spring contact members inherently biased towards each other, a first actuator rigidly connected to one of said contact members and a second actuator having a lost motion connection with the other of said contact members, electromagnetic control means including an armature connected with said second actuator for closing said parking switch irrespective of the position of said first actuator when said electromagnetic control means is energized, and means engageable with said first actuator to open said parking switch when said electromagnetic control means is deenergized.

References Cited in the file of this patent

UNITED STATES PATENTS

| | | |
|---|---|---|
| 2,335,424 | Korte | Nov. 30, 1943 |
| 2,357,152 | Whitted | Aug. 29, 1944 |
| 2,364,603 | Coxon | Dec. 12, 1944 |
| 2,499,298 | Christensen | Feb. 28, 1950 |
| 2,513,247 | Morton | June 27, 1950 |
| 2,717,518 | Latta | Sept. 13, 1955 |
| 2,810,294 | Latta et al. | Oct. 22, 1957 |
| 2,832,225 | Hart | Apr. 29, 1958 |

FOREIGN PATENTS

| | | |
|---|---|---|
| 411,012 | Italy | June 19, 1945 |
| 873,409 | France | July 8, 1942 |